Jan. 10, 1933.  J. A. WINTROATH  1,893,922
SUBMERSIBLE BEARING STRUCTURE
Filed June 18, 1928   2 Sheets-Sheet 1
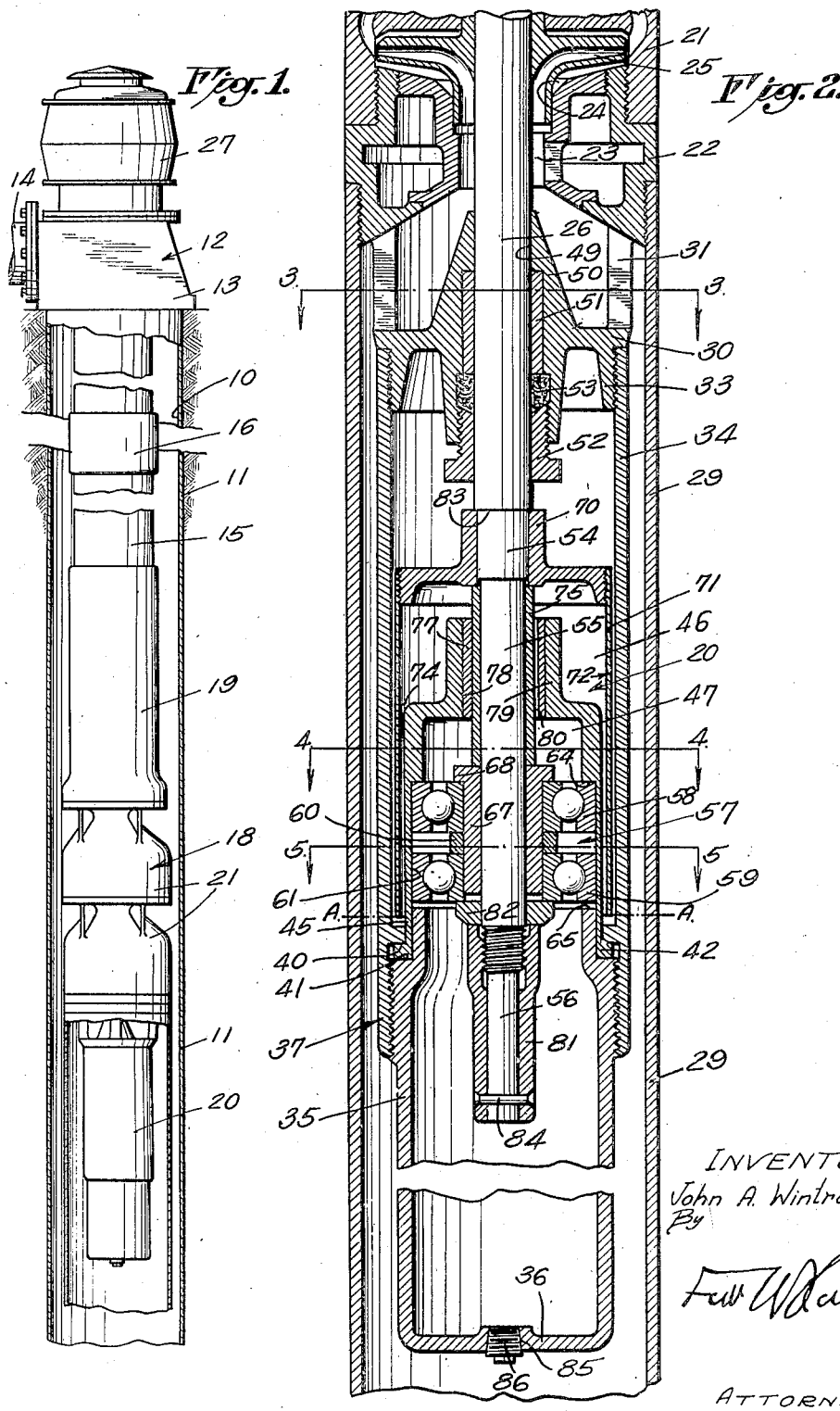
INVENTOR:
John A. Wintroath
By
ATTORNEY.

Jan. 10, 1933.　　　J. A. WINTROATH　　　1,893,922
SUBMERSIBLE BEARING STRUCTURE
Filed June 18, 1928　　2 Sheets-Sheet 2

INVENTOR:
John A. Wintroath
By

ATTORNEY.

Patented Jan. 10, 1933

1,893,922

UNITED STATES PATENT OFFICE

JOHN A. WINTROATH, OF LOS ANGELES, CALIFORNIA, ASSIGNOR TO WINTROATH PUMPS, LTD., OF ALHAMBRA, CALIFORNIA, A CORPORATION OF CALIFORNIA

SUBMERSIBLE BEARING STRUCTURE

Application filed June 18, 1928. Serial No. 286,112.

My invention relates to bearing structures, and more particularly to a novel form of submersible bearing structure which may be operated submerged in a fluid injurious to the bearing surfaces without danger of this fluid reaching these surfaces. I may state that certain aspects of the present invention are broadly covered in the claims of my copending application on method of lubrication for submerged bearing, Ser. No. 263,254, filed Mar. 21, 1928.

In various arts, it is desirable to journal a shaft or other rotating element at a point below the surface of a fluid. It is ordinarily desirable to keep this external fluid from reaching the journalling surfaces, especially where this external fluid carries particles of foreign matter which will injure these surfaces. One particular illustration of such a condition is in the deep-well turbine pumping art where a pump section is supported in a well below the surface of the well fluid therein. This pump unit has impellers therein adapted to be rotated by a pump head situated at the surface of the ground. A shaft connects a drive means at the pump head and the impellers, and it is necessary to journal this shaft below the impellers in order to secure a satisfactory operation of the pump. I shall particularly describe my invention as applicable to such a bearing, without in any way limiting myself thereto.

It is an object of my invention to provide a bearing structure which may be submerged in a fluid injurious to the bearing surfaces without danger of this fluid reaching these bearing surfaces.

A further object of my invention is to provide an inverted bell rotating with the shaft, the interior of this bell trapping a body of lubricating medium in which the bearings rotate, this lubricating medium being of a different density from the external fluid in which the bearing structure is submerged.

Still another object of my invention is to provide a bearing structure having a shell with a dome-shaped member extending across this shell, and a rotating bell extending around the dome-shaped member to prevent any external fluid reaching a bearing support below the top of this dome.

A further object of my invention is to provide a bearing structure having a thrust bearing which is secured in place in a novel manner.

Further objects and advantages of my invention will be made evident hereinafter.

Referring to the drawings, in which one form of my invention is disclosed in relation to the deep-well pumping art,—

Fig. 1 is a utility view showing a deep-well turbine pump installation.

Fig. 2 is a vertical sectional view of the lower portion of the turbine pump illustrated in Fig. 1.

Figure 3:
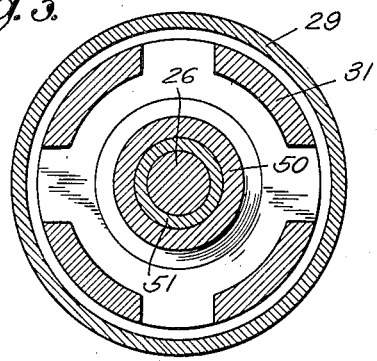
Fig. 3 is a view taken on the line 3—3 of Fig. 2.
Figure 4:
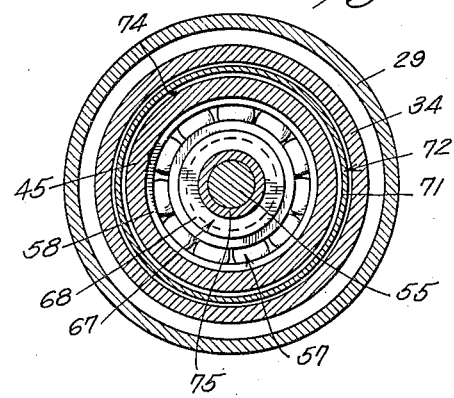
Fig. 4 is a view taken on the line 4—4 of Fig. 2.
Figure 5:
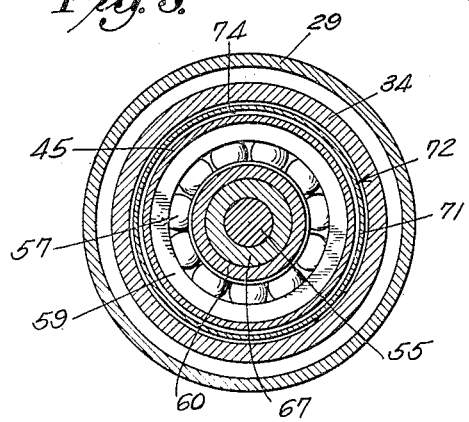
Fig. 5 is a view taken on the line 5—5 of Fig. 2.

Referring particularly to Fig. 1, I illustrate a well 10 in which a well casing 11 has preferably been set, this casing extending from the surface of the ground to a point below the fluid level in the well.

Suitably mounted at the surface of the ground is a pump head 12 having a base 13 communicating with an outlet pipe 14 and a discharge pipe 15. This discharge pipe is formed of a number of lengths secured together by couplings 16 and extends downward inside the casing 11. Supported on the lower end of this discharge pipe is a pump unit 18 comprising an upper bearing structure 19 and a lower bearing structure 20, there being impeller sections 21 situated between the bearing structures 19 and 20.

The details of my invention will best be understood by reference to Fig. 2, which illustrates a sectional view of the lower bearing structure 20. Referring to this view, a lowermost impeller section 21 is shown secured to a spider member 22, this spider member having passages 23 communicating with an impeller chamber 24. An impeller 25 is positioned in the impeller chamber 24 on a shaft 26, this shaft extending upward to the surface of the ground inside the discharge pipe 15 and being rotated by a suitable drive means such as a motor 27 forming a part of the pump head 12.

Threadedly received by the spider member 22 is an intake pipe 29 extending downward to a point below the level of the well fluid.

This spider member 22 has a flange 30 depending from the upper portion thereof by legs 31. Threadedly received by a collar 33 of the flange 30 is an upper cylindrical member 34. A lower cylindrical member 35, having a bottom plate 36, is threadedly received by the lower end of the upper cylindrical member 34. The flange 30 and the cylindrical members 34 and 35 cooperate to form a shell 37 in which the novel bearing structure of my invention is positioned.

Clamped between the lower face of an annular ledge 40 extending inward from the upper cylindrical member 34, and an annular face 41 formed on the lower cylindrical member 35, is an annular lip 42 formed on the lower end of a dome-shaped bearing-enclosing member 45. This dome-shaped member is hollow, as indicated in Fig. 2, and divides the space inside the shell 37 into a separating chamber 46 and a bearing chamber 47. Said separating chamber 46 may be regarded as comprising the space within member 34 at the outside of the bearing housing 45. And the latter may be regarded, irrespective of its function of providing a bearing enclosure, as a sleeve extending upwardly around the shaft from the lower lubricant chamber 35.

The shaft 26 extends downward through an opening 49 in a hub 50 of the flange 30, and may be journalled therein by a sleeve 51 if desired. The lower end of the opening 49 is counterbored and threaded to receive a packing gland 52 which compresses a packing 53 in the upper end of the counterbore. The lower end of the shaft 26 has reduced diameter portions 54, 55, and 56, and this lower end is adapted to be journalled in a thrust bearing 57 which may conveniently be formed of upper and lower thrust bearings 58 and 59 held apart by a spacer 60. Each of the thrust bearings 58 and 59 has an outer race of such a diameter as to be slidable in a bore 61 of the bearing-enclosing member 45.

The thrust bearing 57 is vertically movable in the bore 61, the uppermost position of this bearing being determined when the outer race of the bearing 58 engages an annular shoulder 64 of the member 45. Similarly, the lowermost position of the bearing 57 is determined by an engagement between the outer race of the bearing 59 on the upper annular face 65 formed on the upper end of the lower cylindrical member 35, this upper end fitting in the bore 61 as shown.

The inner races of the bearings 58 and 59 are of such a diameter as to snugly fit the external surface of a sleeve 67, this sleeve surrounding the portion 55 of the shaft 26 and having a flange 68 engaging the upper face of the inner race of the bearing 58.

Secured in fluid-tight relationship to the portion 54 of the shaft 26 is a plate 70, this plate threadedly receiving the upper end of an apron 71 in a manner to form an inverted bell 72. As clearly shown in Fig. 2, the lower end of the apron 71 extends downward in an annular space 74 formed between the upper cylindrical member 34 and the dome-shaped member 45. The lower end of the apron 71 terminates at a level A—A which is slightly above the upper face of the annular ledge 40.

A spacer 75 surrounds the portion 55 of the shaft and contacts the lower edge of the plate 70 and the upper edge of the sleeve 67. This spacer may be journalled in a sleeve bearing 77 pressed in a bore 78 formed in a hub 79 at the upper end of the dome-shaped member 45. However, this journalling action should not be sufficiently tight to preclude a passage of fluid from the interior of the bell 72 into the dome-shaped member 45. In order that this communication be maintained I prefer to provide a longitudinal channel 80 in the sleeve 77, this channel opening on the spacer 75.

The portion 56 of the shaft 26 is threaded and is adapted to receive a nut 81 having a neck portion surrounding the portion 56. Spaced between the inner race of the bearing 59 and the nut 81 is a ring 82. Thus, by tightening the nut 81 on the portion 56 of the shaft, the plate 70 is clamped against a shoulder 83 of the shaft by the spacer 75. This spacer is furthermore clamped by the nut 81 to the sleeve 67, the inner races of the bearings 58 and 59 and the ring 82 being similarly clamped between the sleeve 67 and the nut 81. Thus, by tightening the nut 81, the whole structure is rigidly secured in place. A pin 84 may be passed through the nut 81 and the portion 56 of the shaft in order to prevent any loosening of this nut.

In installing my invention, it is desirable to completely fill the bearing chamber 47 and the separating chamber 46 with a lubricating medium which insures a proper lubrication of the bearing surfaces. This may be conveniently done by upturning the lower bearing structure 20 and filling the chambers 46 and 47 through an opening 85 closed by a plug 86. It is necessary to my invention that the bearing chamber 47, and the interior of the bell 72 be completely filled with lubricating medium. This medium may be in the form of an oil which is relatively incompressible, and should be of a density which is less than that of the external fluid in which the bearing structure is submerged.

It will be noted that the barrel 34 serves to confine a liquid column, and that said column is supported independently of the well liquid.

That is, for example, should for any reason the well liquid fall to a level below the separating chamber, the column of liquid in the chamber would remain supported to maintain the seal regardless.

In operation, the impellers 25 draw well fluid upward around the shell 37 and between the legs 31, this fluid then passing upward through each impeller and through the discharge pipe 15 to the surface of the ground. With continued use, the packing 53 surrounding the shaft 26 will become worn, thus allowing a seepage of well fluid downward around the shaft 26 through the bore 49 and into the upper end of the separating chamber 46. If the separating chamber is completely filled with lubricating medium, it should be clear that an equal amount of this lubricating medium must be forced upward around the shaft 26 inasmuch as the lubricating medium is relatively incompressible. Any well fluid which enters the upper end of the separating chamber will pass downward around the apron 71 of the bell 72. This downward movement will take place due to the fact that the well fluid is of a greater density than the lubricating medium.

This well fluid may fill the space between the line A—A and the upper edge of the annular ledge 40, but it should be understood that this well fluid cannot rise in the annular space between the apron 71 and the member 45. Such a movement is prevented by the relative incompressibility of the lubricating medium in the upper end of the bell 72 and in the bearing chamber 47. However, well fluid may completely fill that portion of the annular space 74 which lies outside the apron 71. Due to the difference in densities of the well fluid and lubricating medium the bell 72 acts as a trap to prevent any of the well fluid from rising in the interior thereof.

If, through accident or defective parts a leakage between the interior and exterior of the bell 72 takes place, the well fluid will pass downward through the channels 80 into the bearing chamber 47. This well fluid will immediately drop downward in the bearing chamber to the lower end thereof, thus displacing an equal volume of lubricating medium upward and through the bearing 57, thus insuring a correct lubrication thereof until the lubricating medium has been completely displaced from the bearing chamber.

As a result of rotation of the shaft and bearing parts within the lower lubricant containing chamber, there may be set up an agitating or pumping action tending to displace a certain amount of the lubricant therein upwardly through passage 80 and into the upper interior of the inverted seal cup. Such displacement may also occur as a result of expansion of the lubricant due to conduction of heat from the bearing. Under these circumstances, the upper interior of the liquid seal skirt 71 may be regarded as a displacement chamber adapted to receive lubricant expelled from the lower bearing chamber. Upon lubricant being displaced out of the lower chamber into the upper interior of the seal cup, a corresponding amount of well liquid at the bottom of the column enclosed by skirt 72, will be displaced around the lower edge of the skirt into the column immediately enclosed by wall 34.

Assuming now the shaft to be stopped from rotating and the bearing and lubricant therein to have become cooled, a reverse displacement of the lubricant will occur from the upper interior of the seal cup into the bearing chamber by way of passage 80, this displacement resulting from the pressure exerted by the column of liquid within tube 34 at the outside of the skirt. Assuming the interior of the seal cup to be substantially filled with lubricant, by no possibility can the well liquid, as a result of the surge of lubricant between the bearing chamber and the seal cup interior, gain access to the bearing chamber by rising to the point of flowing into the upper end of passage 80. The lubricant, being of lower specific gravity than the well liquid, will at all times be supported in a column within the seal skirt above the well liquid surface in the lower interior thereof, and therefore the described surging action as a result of displacement of lubricant from the bearing chamber, or vice versa, will result merely in variations in the height to which the well liquid may rise within the lower portion of the seal skirt.

I claim as my invention:

1. In a well pump submersible bearing structure, the combination of: walls forming a separating chamber, walls forming a bearing chamber separate from said separating chamber, a tubular casing surrounding said chambers and connected to the separating chamber walls above said bearing chamber, said separating chamber being communicable with an external fluid and with a lubricating medium in said bearing chamber; a bearing in said bearing chamber; a shaft journalled by said bearing and extending through said separating chamber; and means in said separating chamber preventing a rise of said external fluid to a point of access to said bearing.

2. In a well pump submersible bearing structure, the combination of: walls forming a separating chamber, walls forming a bearing chamber separate from said separating chamber, a tubular casing surrounding said chambers and connected to the separating chamber walls above said bearing chamber, said separating chamber being communicable with an external fluid and with a lubricating medium in said bearing chamber; a bearing in said bearing chamber; a shaft journalled by said bearing and extending through said separating chamber; and means in said separating chamber preventing any of said external fluid reaching said bearing.

3. In a well pump submersible bearing structure, the combination of: walls forming a separating chamber, walls forming a bearing chamber, said walls including a member separating said chambers, said separating chamber being communicable with an external fluid and with a lubricating medium in said bearing chamber; a shaft extending into said chambers through said member; a bearing in said bearing chamber adapted to journal said shaft; and means in said separating chamber and rotating with said shaft to separate said lubricating medium in said bearing chamber from any of said external fluid in said separating chamber.

4. In a well pump submersible bearing structure, the combination of: walls forming a separating chamber, walls forming a bearing chamber and including a member separating said separating chamber from said bearing chamber; a shaft extending into said chambers and through said member; a bearing in said bearing chamber adapted to journal said shaft; and an inverted bell rotating in said separating chamber, the interior of said bell and said bearing chamber being filled with a relatively incompressible lubricating medium, and the exterior of said bell being communicable with an external fluid in which said bearing structure is submerged.

5. In a submersible bearing structure, the combination of: walls defining a bearing chamber substantially filled with a lubricating medium, said walls including a dome-shaped member defining the upper end of said bearing chamber; a rotatable shaft extending downward into said bearing chamber and through said dome-shaped member; and an inverted cup member extending downward over said dome-shaped member and being in fluid-tight relationship with said shaft, there being an annular space between said dome-shaped member and said cup member which is filled with a body of said lubricating medium in pressure-equalizing contact with the external liquid in which said bearing structure is submerged at a level determined by the lower edge of said cup member, said external liquid being of greater density than said lubricating medium.

6. A combination as defined in claim 4 in which the junction of said shaft and said member lies inside said bell.

7. In a submersible bearing structure, the combination of: an enclosed shell; a rotatable shaft extending into said shell; a member extending across said shell and defining one end of a bearing chamber; a bearing in said bearing chamber, said bearing journalling said shaft; and rotating means disposed adjacent said member and in telescoping relationship therewith for preventing any external fluid in which said bearing structure is submerged from entering said bearing chamber.

8. In a submersible bearing structure, the combination of: an enclosed shell; a rotatable shaft extending into said shell; a member extending across said shell and defining one end of a bearing chamber, said bearing chamber being substantially filled with a lubricating medium the density of which is lower than that of the external fluid in which said shell is submerged; a bearing in said bearing chamber, said bearing journalling said shaft; and a rotating bell partially surrounding said member to provide an annular space in which is entrapped a body of said lubricating medium which is in contact with any external liquid in said shell at a section defined by the lower end of said bell.

9. In a submersible bearing structure, the combination of: a shell comprising a plurality of members secured together; a bearing enclosing member clamped between two of said members, said bearing enclosing member dividing said shell into a bearing chamber and a separating chamber; a bearing retained inside said bearing enclosing member; a shaft journalled in said bearing and extending through said bearing enclosing member; and means in said separating chamber for preventing any external fluid in which said bearing structure is submerged from reaching the junction between said shaft and said bearing enclosing member.

10. In a submersible bearing, the combination of: upper and lower cylindrical walls; a dome-shaped member clamped between said upper and lower cylindrical walls; a shaft extending through said dome-shaped member; a bearing in said dome-shaped member adapted to journal said shaft; and an inverted bell extending over said dome-shaped member, the interior of said bell being communicable with a lubricating medium surrounding said bearing, and the exterior of said bell being communicable with the external fluid in which said bearing structure is submerged.

11. In a submersible bearing, the combination of: a substantially closed shell; a dome-shaped member extending across said shell; a shaft extending through said dome-shaped member; a bearing in said dome-shaped member adapted to journal said shaft; and an inverted bell extending over said dome-shaped member, the interior of said bell being communicable with a lubricating medium surrounding said bearing, and the exterior of said bell being communicable with the external fluid in which said bearing structure is submerged.

12. In a submersible well pump or the like, walls forming a lubricant containing chamber, a shaft extending downwardly into said chamber through an opening in the upper wall thereof, a tubular member projecting upwardly from said chamber around said shaft, a tubular wall confining a substantially enclosed liquid column communicating through said tubular member with said lubricant chamber, and seal means associated with said member for preventing the flow of said column liquid into the lubricant chamber, said tubular wall extending above and substantially enclosing said seal means and well liquid being admissible to the interior of said tubular member only at a point located a substantial distance above said seal means.

13. In a submersible well pump or the like, walls forming a lubricant containing chamber, a shaft extending downwardly into said chamber through an opening in the upper wall thereof, a sleeve projecting upwardly from said chamber around said shaft, means confining a substantially enclosed liquid column having fluid communication through said sleeve with said lubricant chamber, and an inverted seal cup carried on said shaft and extending over and around the upper end of said sleeve, said liquid column extending, independently of the well liquid level, a substantial distance above the interior space of said seal cup.

14. In a submersible well pump or the like, the combination comprising, walls forming a substantially closed lubricant chamber, walls forming a substantially closed chamber above said lubricant chamber and supporting a liquid column, a shaft extending through openings in the upper walls of said chambers, and means preventing access of liquid in the upper chamber to the lower lubricant containing chamber, the second mentioned chamber being closed from the well liquid except as to the well liquid leakage that may occur through the shaft passing opening in the upper wall thereof.

15. In a submersible well pump or the like, the combination comprising, walls forming a substantially closed lubricant chamber, walls forming a substantially closed chamber above said lubricant chamber and supporting a liquid column, a shaft extending through openings in the upper walls of said chambers, a restricted flow of well liquid being permitted into the upper chamber solely through its shaft passing opening, a roller bearing journalling said shaft within said lubricant chamber, and means preventing access of well liquid in the upper chamber to the lower lubricant chamber.

16. In a submersible well pump or the like, the combination comprising, walls forming a substantially closed lubricant chamber, walls forming a substantially closed chamber above said lubricant chamber and supporting a liquid column, a shaft extending through openings in the upper walls of said chambers, a restricted flow of well liquid being permitted into the upper chamber solely through its shaft passing opening, a roller bearing journalling said shaft within said lubricant chamber, a sleeve extending upwardly around said shaft from said lubricant chamber and terminating within said upper chamber, and an inverted cup carried on said shaft and extending over and around the upper end of said sleeve.

17. In a submersible well pump or the like, the combination comprising, walls forming a substantially closed lubricant chamber, walls forming a substantially closed chamber above said lubricant chamber and supporting a liquid column, a shaft extending through openings in the upper walls of said chambers, and an inverted seal cup carried on said shaft and extending downwardly around and below the opening in the upper wall of said lubricant chamber, said liquid column being closed to the well liquid at least to a point a substantial distance above the interior of said seal cup.

18. In a submersible well pump or the like, walls forming a lubricant containing chamber, walls forming a displacement chamber adapted to receive lubricant that may be displaced from the first mentioned chamber, and means confining a column of liquid communicable with the well liquid and extending above said displacement chamber, means for substantially enclosing said liquid column at its upper end, said column of liquid being in communication with the displacement chamber and exerting a pressure on the lubricant therein, and said column being communicable with the well liquid only at a point a substantial distance above said displacement chamber.

19. In a submersible well pump or the like, the combination comprising, walls forming a substantially closed lubricant chamber, walls forming a substantially closed chamber above said lubricant chamber and supporting a liquid column, a shaft extending through openings in the upper walls of said chambers, and means preventing access of liquid in the upper chamber to the lower lubricant containing chamber, said means comprising walls forming a displacement chamber adapted to receive lubricant that may be displaced from said lubricant chamber, and said column of liquid being in communication with the displacement chamber and exerting a pressure on the lubricant therein and said column being closed from the well liquid to a point at a substantial distance above said displacement chamber.

20. In a submersible well pump or the like, walls forming a lubricant containing chamber, a shaft extending downwardly into said chamber through an opening in the upper wall thereof, a tubular member, the sides of which are enclosed from the well liquid, projecting upwardly from said chamber around said shaft, a tubular wall extending a substantial distance above said member and confining a liquid column which communicates through said tubular member with said lubricant chamber, means enclosing said liquid column at its upper end, and seal means associated with said member for preventng the flow of said column liquid into the lubricant chamber, said seal means comprising walls forming a displacement chamber adapted to receive lubricant that may be displaced from said lubricant chamber, and said column of liquid being in communication with the displacement chamber and exerting a pressure on the lubricant therein.

21. In a submersible well pump or the like, the combination comprising. walls forming a substantially closed lubricant chamber, walls forming a substantially closed chamber above said lubricant chamber and supporting a liquid column, a shaft extending through openings in the upper walls of said chambers, and an inverted seal cup carried on said shaft and extending downwardly around and below the opening in the upper wall of said lubricant chamber, said seal cup forming a displacement chamber adapted to receive lubricant that may be displaced from said lubricant chamber, and said column of liquid being in communication with the displacement chamber and exerting a pressure on the lubricant therein.

In testimony whereof, I have hereunto set my hand at Los Angeles, California, this 12th day of June, 1928.

JOHN A. WINTROATH.